3,336,807
PRESSURE TRANSDUCER
Victor A. J. van Lint, La Jolla, San Diego, Robert A. Poll, San Diego, and Howard R. Kratz, La Jolla, San Diego, Calif., assignors to General Dynamics Corporation, New York, N.Y., a corporation of Delaware
Filed Sept. 18, 1963, Ser. No. 309,804
18 Claims. (Cl. 73—398)

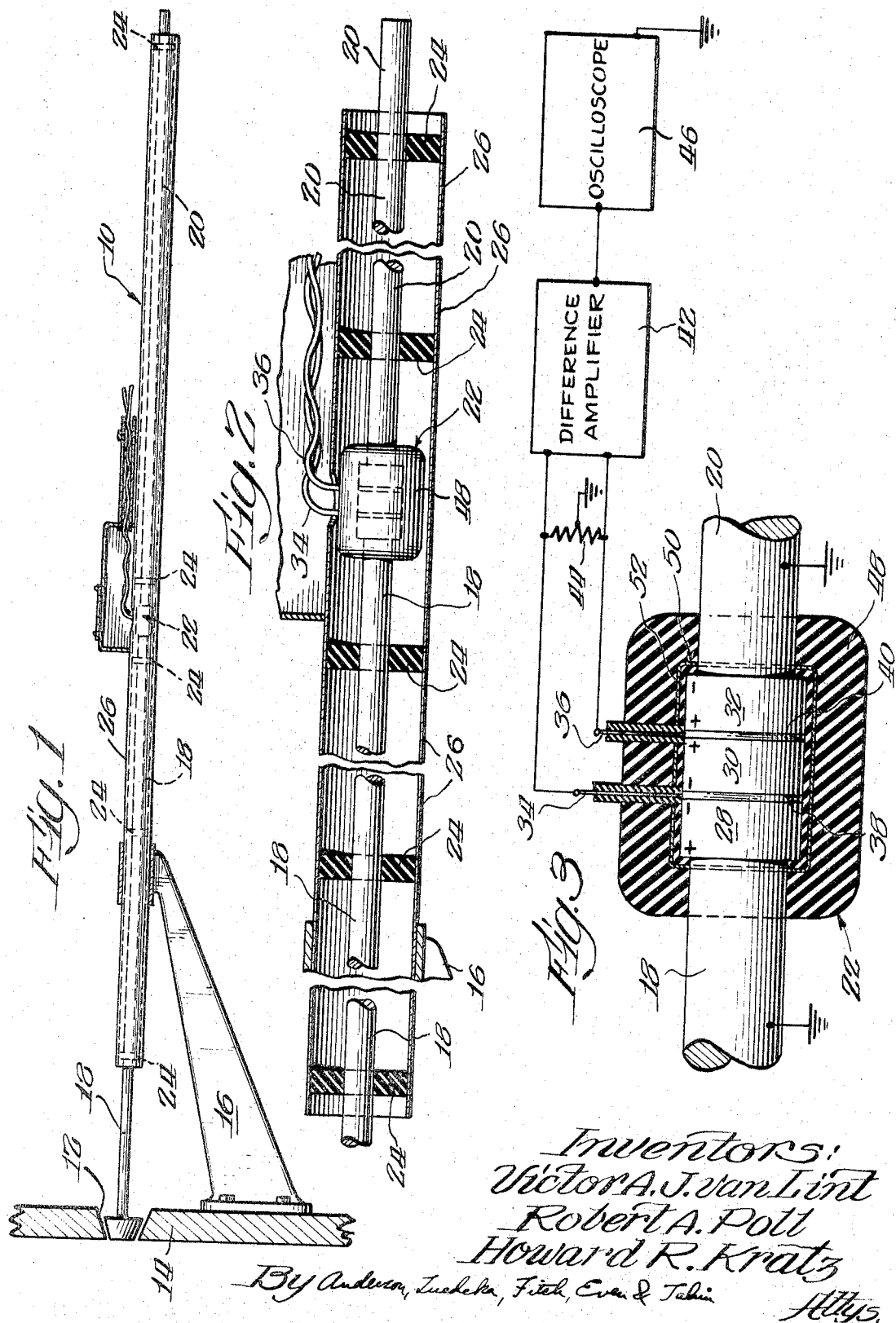

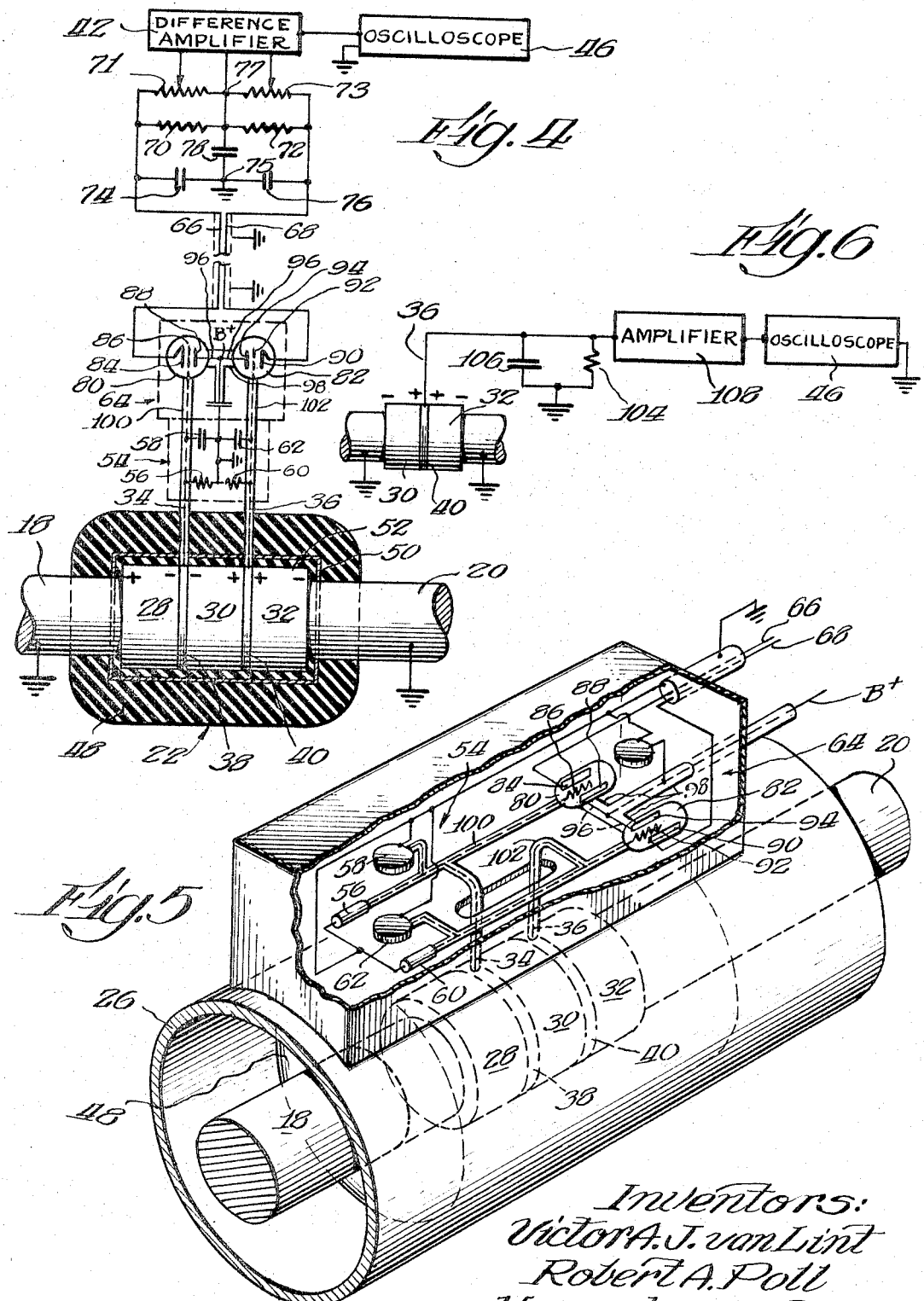

This invention relates to pressure transducers, and more particularly to pressure gauges which incorporate piezoelectric crystals for measuring high intensity pressure pulses in the presence of high radiation intensity such as occur in the vicinity of nuclear blasts. This is a continuation-in-part of our copending application Ser. No. 217,052, filed Aug. 15, 1962, for "Pressure Transducer."

This invention is an improvement on the apparatus disclosed in the copending application of Howard R. Kratz and Albert W. Blackstock, Ser. No. 177,891, filed Mar. 6, 1962 for "Pressure Transducer," now Patent No. 3,137,171. In this prior art apparatus, a piezoelectric crystal was cemented between adjacent ends of aligned rods made of dissimilar materials and the remote end of the denser rod was exposed to the pressure wave. While this serves as an effective device for measuring high intensity pressure pulses having magnitudes greater than one kilobar, it has been found that in high radiation fields, radiation effects interfere with pressure measurement. Since one of the important measurements of high intensity pressure pulses is in the vicinity of nuclear detonations where high radiation fields are also present, it has been found desirable to develop a pressure transducer which is substantially unaffected by the presence of such radiations as neutrons, gamma rays and electrons.

We have discovered that there are at least three ways in which the radiation affects the pressure measurement. One is by the build up of charge on the elements of the pressure measuring system, such as the pressure sensing rods and the crystal itself. Another is the dissipation of the charge developed on the crystal occasioned by the ionization of the surrounding gas by the radiation; the ionized gas serves as a leakage path between the faces of the crystal. A third is the effect upon the elements of the output circuit of the crystal.

We have discovered that these effects can be reduced by a factor as much as 1,000 by use of a particular balanced system wherein both pressure rods are grounded and where the crystal itself is surrounded with a particular material to compensate for charges otherwise entering or leaving the crystal, at the same time excluding air from the vicinity of the crystal. With this system it is possible to detect pressure pulses of about 1.5 kilobars at a signal to noise ratio of 100 to 1 in a radiation field intensity of $10^{10}$ roentgens per second. In radiation fields of lesser intensity, it may be desirable to utilize less than all of the features of this invention.

Therefore, the primary object of this invention is to provide a pressure transducer which is capable of effecting measurements of high intensity pressure pulses in the presence of high intensity radiation. It is a further object of the invention to minimize the effect of charges accumulating on various parts of the pressure transducer, and connecting cables. It is a still further object of the invention to minimize the effect of ionization of the atmosphere in which the pressure transducer is disposed.

Other objects and advantages of the present invention will become apparent from the following detailed description, particularly when considered in conjunction with the accompanying drawings, in which:

FIGURE 1 is a side elevation showing one form of piezoelectric pressure transducer constructed in accordance with the present invention;

FIGURE 2 is an enlarged fragmentary view, partly in section, of the apparatus of FIGURE 1;

FIGURE 3 is an enlarged view, partly in section and partly diagrammatical, showing the details of the piezoelectric crystal assembly of the apparatus of FIGURE 1, and the electrical connections from the crystal to the measuring circuits;

FIGURE 4 is an enlarged view, partly in section and partly diagrammatical, showing the crystal assembly of FIGURE 3 with integrating and cathode follower circuits;

FIGURE 5 is a further enlarged view in perspective of the apparatus of FIGURE 4, showing the mounting of the integrating and cathode follower elements on the crystal assembly; and FIGURE 6 is an enlarged view, partly in section, and partly diagrammatical, showing a simplified form of the invention utilizing a pair of oppositely poled crystals with one side of each connected to a grounded rod.

As shown in FIGURE 1, one end of a pressure transducer 10 may be mounted in an aperture 12 in a mounting plate 14, being held in place by mounting bracket 16. The end exposed to the pressure pulse preferably comprises a rod 18 which may be made of tungsten. As shown better in FIGURE 2, the pressure transducer also comprises a second rod 20 which may be made of a lighter metal such as magnesium, and between the rods is cemented a crystal assembly 22. These elements may be mounted on grommets 24 in a case 26 which may be made of brass. Except for the crystal assembly itself and its electrical connections, the apparatus may be constructed generally as described in the aforesaid copending Patent No. 3,137,171.

The crystal assembly 22 is shown in greater detail in FIGURE 3. As shown, the crystal assembly comprises a plurality of piezoelectric crystals 28, 30 and 32. X-cut quartz crystals have been found to be satisfactory. Other piezoelectric crystals which are not adversely affected by radiation could also be utilized. The crystals are preferably mounted with a particular polarity so that the electrical outputs of the crystals 28 and 32 are in series and the output of crystal 30 is in parallel with this series combination. Rods 18 and 20 are both electrically grounded. Crystal 28 is cemented to the end of rod 18 and crystal 32 is cemented to the end of rod 20. The outer faces of crystals 28 and 32 are mechanically and electrically coupled to the respective rods and are therefore at the same potential, i.e., ground. The crystals are poled so that if the inner face of crystal 28 is negative, the facing inner face of crystal 32 is positive. At the same time, crystal 30 is poled such that its face adjacent to crystal 28 is of the same polarity as the adjacent face of crystal 28. Similarly, the face of crystal 30 adjacent to crystal 32 is of the same polarity as the adjacent face of crystal 32 and may be as shown in FIGURE 3. The output of the crystal sandwich is developed on shielded leads 34 and 36 connected to thin conducting plates 38 and 40. Thin conducting plate 38 is disposed between and cemented to the adjacent faces of crystals 28 and 30, and thin conducting plate 40 is disposed between and cemented to adjacent faces of crystals 30 and 32. Crystals 28 and 32 are preferably substantially identical, and crystal 30 may be like the others except oppositely poled.

With this symmetrical arrangement, the output signals appearing on leads 34 and 36 are of opposite polarity, and are thus balanced to ground. Leads 34 and 36 may, therefore, be said to constitute a balanced line. This output is applied to a difference amplifier 42, which may be conventional and include an input resistor 44. The difference amplifier 42 amplifies the difference between the signals appearing on leads 34 and 36. Since the signals are of opposite polarity the output of the difference amplifier is the sum of the absolute values of the two signals. The amplified signal is then applied to a utilization circuit which may be a conventional measuring apparatus such as an oscilloscope 46.

The particular arrangement disclosed for the crystals and the output circuit, has an additional advantage in that it provides a four-fold improvement over the apparatus disclosed in the aforesaid copending application, Ser. No. 177,891. The crystal sandwith develops twice the charge of the single crystal and this charge flows through an input resistor twice as large as were an ordinary amplifier used. That is, were the charge from a single crystal applied to one-half of the difference amplifier (grounding the centerpoint of the input resistor), only one-fourth the signal would be developed as is developed with the arrangement of FIGURE 3.

Although shielding would reduce the effects of radiation on the pressure transducer, it is not practical to dispose sufficient shielding material around the pressure transducer to eliminate the effect of the radiation when the radiation field is of high intensity. Hence, other steps are necessary.

Radiation striking the apparatus tends to build up charges here and there about the device. Electrons striking certain parts of the device may build up a negative charge. Alternatively, these electrons may knock secondary electrons from certain parts of the device, thereby leaving a net positive charge. Similarly, gamma rays may knock off electrons through the photoelectric effect, Compton scattering or pair production. In the apparatus of the copending Patent No. 3,137,171, an appreciable charge was sometimes accumulated on the ungrounded rod. In the instant invention, both rods 18 and 20 are grounded. Inasmuch as both rods are made of conductive material, any charge is immediately drained off to ground. On the other hand, the crystals, being essentially nonconductive, may accumulate charge. Because of the balanced arrangement, the accumulated charge is balanced out to a considerable extent. However, it has been found desirable to reduce the accumulation of charge developed on the crystals by surrounding the crystals with material that will balance charges absorbed by and emitted from the crystals. To achieve this, an insulating material 48 is disposed about the crystals to serve as a source and sink for electrons. This material is preferably much like the material of the crystals themselves. At least it should preferably have the same atomic number. The device will then look something like a large homogeneous ball to incident gamma rays and electrons. Under such conditions, any electrons passing into the crystals are substantially balanced by electrons knocked out of the crystals. In this respect, there is no real dividing line between the crystals and the surrounding material, and no net charge is accumulated on the crystals. When the crystals are of quartz, it has been found suitable to surround the crystals with silicone rubber, loaded with silica to provide the appropriate atomic number. Inasmuch as a net charge may accumulate on the surrounding material 48 which may distort the output, the crystals and the material 48 are separated by a thin, grounded, conducting layer 50 which may be a coating of silver paint. This serves as an electrostatic shield, and prevents any charge accumulated on material 48 from affecting the output of the crystal assembly. At the same time, the conductive layer 50 cannot be permitted to short-circuit the crystals, and therefore a thin insulating layer 52 is disposed between the conducting layer 50 and the crystals 28, 30 and 32. This insulating layer also serves to exclude ionizable gas from the region of the crystal, hence eliminating the short-circuiting effect of the air about the crystals.

It may be noted that the output voltage of the apparatus of FIGURE 3 is proportional to the change of pressure with respect to time provided the circuit decay time, which is equal to the product of the resistance of resistor 44 and the stray capacitance, is small compared to the rise or fall time of the pressure pulse. In some instances, it is preferable to measure the pressure itself in which case one may integrate the signal as, for example, by using an integrating circuit 54 as shown in FIGURES 4 and 5. The integrating circuit 54 comprises two identical integrating circuits, one comprising resistor 56 and conductor 58 and the other comprising resistor 60 and condenser 62. Resistor 56 and condenser 58 are connected in parallel between ground and lead 34. Similarly resistor 60 and condenser 62 are connected in parallel between ground and lead 36. The time constant of the integration circuit is preferably made long relative to the pressure pulse so that the integrating circuit develops a signal related to the total pressure pulse. At the same time it is preferable that the time constant be short relative to the time delay between the arrival of the radiation pulse and arrival of the pressure pulse at the crystal assembly in order that the effects of the radiation pulse may be substantially dissipated before the arrival of the pressure pulse. In certain applications the most intense part of the radiation pulse has been found to have lasted less than 1 microsecond while the duration of the pressure pulse was about 20 microseconds. The radiation reached the crystal assembly without substantial delay, whereas the pressure pulse traveling down the rod at the speed of sound reached the crystal assembly after a time delay of about 130 microseconds. Under these circumstances, it has been found desirable to utilize a time constant of about thirty microseconds.

Frequently, the difference amplifier 42 and oscilloscope 46 are located some distance from the pressure transducer. Under such circumstances, the leads to the difference amplifier may accumulate charges and provide a signal dependent upon incident radiation. Such signals produced in these leads are reduced by the arrangement of FIGURE 4 where a dual cathode follower circuit 64 is coupled between the integrating circuit 54 and long leads 66 and 68 over which signals travel from the transducer to the difference amplifier 42. The cathode follower circuit serves to lower the impedance level so that any charges that may develop on long leads 66 and 68 produce but a relatively small signal at the difference amplifier. Further, the leads 66 and 68 are preferably part of a shielded cable so that both leads are in very nearly the same environment, in which case the charges developed on each will be approximately the same, resulting in no substantial difference in voltage between the two leads in the difference amplifier 42.

The input circuit to the difference amplifier includes resistors 70 and 72 and condensers 74, 76 and 78. Potentiometers 71 and 73 are connected across resistors 70 and 72, respectively, and the inputs to the difference amplifier 42 are taken from these potentiometers, which may be mechanically connected to operate together. The connection 75 common to the condensers may be grounded, and the connection 77 common to the resistors may be connected to a biasing voltage. At the same time, it is desirable to minimize the length of leads 34 and 36 between the transducer and the tubes 80 and 82 of the cathode follower circuit 64. Tube 80 comprises a cathode 84, a control grid 86 and a plate 88. Tube 82 includes a cathode 90, a control grid 92 and plate 94. The tubes are preferably of a type that do not require tube sockets so as to avoid spurious signals occasioned by the large masses of material associated with a socket. The tubes are preferably mounted directly above the pressure transducer whereby the leads 34 and 36 can be kept less than an inch long. B+ voltage is supplied to the cathode follower 54 over leads 96. To reduce the effect of the ionization of air by the radiation leads 96 are coated with insulation 98. Preferably a heavy coating of epoxy of about $\frac{1}{16}$ inch is used to reduce capacitive coupling to the ionized air.

The low voltage leads 34 and 36 are likewise coated with insulation 100 and 102, respectively, as with epoxy, to prevent leakage occasioned by air ionization. However, the insulation 100 and 102 is made very thin in order to keep the mass of these leads low and thereby keep down the accumulation of charge on these leads. Similarly, the leads themselves are preferably of very fine wire for the same purpose. Wire of 0.008 inch diameter has proven satisfactory.

The use of a plurality of piezoelectric crystals symmetrically arranged as described and surrounded with the material described together with the use of a balanced output, an integrating circuit, a cathode follower circuit and a difference amplifier, and with both pressure rods grounded provides the following improvements over the apparatus of the prior art:

(a) The signal from a given pressure pulse is increased.

(b) The spurious signal caused by the accumulation of radiation produced charge on the rods is eliminated.

(c) Spurious signals produced by the action of radiation on the crystals and their output circuit is substantially balanced out electronically.

(d) The accumulation of radiation produced charge on the crystals is reduced by providing a balancing charge.

(e) Changes in conductivity due to radiation-induced gas ionization are prevented by the exclusion of ionizing gas.

It is to be understood that although preferred forms of the invention have been described, other modifications come within the invention. For example, the central crystal is not necessary. A balanced system within the scope of this invention might include other insulating material in place of the crystal 30. It is necessary that this member mechanically couple together the crystals 28 and 32 while keeping the faces of opposite polarity electrically insulated from each other. It is also possible to include additional crystals. It is preferred that such additional crystals preserve the symmetry, however, so that the same balanced system may prevail. It should also be noted that each crystal may in fact be formed of a plurality of crystals and that the ground connection may be local or instrument ground.

The features included in a particular transducer depends upon the relative intensity of the radiation. Once the "noise" produced by the radiation is reduced to a degree negligible compared to the pressure signal, there is no reason to include additional features. For radiation fields of greater intensity, more of the features of this invention must be used. In some instances, the radiation intensity is such that it is satisfactory merely to ground both of the rods 18 and 20 without using a balanced output, as shown in FIGURE 6. In this case, only two crystals 30 and 32 are used. As shown, they are oppositely poled and the output is taken between lead 36 and ground. The oscilloscope 46 may be the same as that shown in FIGURE 3, 4 and 5, but the amplifier 108 need not be a difference amplifier and the input to the amplifier comprises resistor 104 and condenser 106 connected in parallel with one side grounded.

Therefore, the invention is limited only by the following claims.

What is claimed is:

1. Apparatus for measuring pressure pulses comprising a pair of longitudinally spaced electrically grounded pressure rods, a plurality of piezoelectric crystals disposed between said pressure rods, said crystals being arranged symmetrically about a transverse axis and mechanically connected to one another and to said rods in such manner as to transmit at least part of a pressure pulse from one of said rods through successive crystals to the other of said rods, pickup means connected to said crystals to pick up any electrical signals developed on the opposing faces of said crystals, and measuring means connected to said pickup means for measuring a function of the signals thereon as an indication of pressure pulses applied to one of said rods.

2. Apparatus for measuring pressure pulses comprising a pair of longitudinally spaced electrically grounded pressure rods, a plurality of piezoelectric crystals disposed between said pressure rods, said crystals being arranged symmetrically about a transverse axis and mechanically connected to one another and to said rods in such manner as to transmit at least part of a pressure pulse from one of said rods through successive crystals to the other of said rods, pickup means connected to said crystals to pick up any electrical signals developed on the opposing faces of said crystals, and measuring means connected to said pickup means for measuring a function of the signals thereon as an indication of pressure pulses applied to one of said rods, said measuring means including an integrating circuit for integrating said signals with respect to time.

3. Apparatus for measuring pressure pulses in the presence of radiation pulses of longer duration comprising a pair of longitudinally spaced pressure rods, piezoelectric crystal means disposed between said pressure rods, said crystal means being mechanically connected to said rods in such manner as to transmit at least part of a pressure pulse from one of said rods through said crystal means to the other of said rods, pickup means connected to said crystals to pick up any electrical signals developed by said crystal means, integrating means connected to said pickup means for integrating said signals with respect to time to develop integrated output signals, the time constant of said integrating means being long relative to the duration of said pressure pulses and short relative to the time between one of said radiation pulses and a corresponding one of said pressure pulses, and measuring means connected to said integrating means for measuring said integrated output signals as an indication of pressure pulses applied to one of said rods.

4. Apparatus for measuring pressure pulses comprising a pair of longitudinally spaced pressure rods, a plurality of piezoelectric crystals disposed between said pressure rods, said crystals being arranged symmetrically about a transverse axis and mechanically connected to one another and to said rods in such manner as to transmit at least part of a pressure pulse from one of said rods through successive crystals to the other of said rods, the ones of said crystals adjacent to the respective ones of said rods being poled in the same direction, means including a balanced line connected to said crystals to pick up any electrical signals developed between the opposing faces of said ones of said crystals, and measuring means connected to said balanced lines for measuring a function of the signals thereon as an indication of pressure pulses applied to one of said rods.

5. Apparatus for measuring pressure pulses comprising a pair of axially aligned, longitudinally spaced, electrically grounded pressure rods, a plurality of piezoelectric crystals axially disposed between said pressure rods, said crystals being arranged symmetrically about a transverse axis of symmetry and mechanically connected to one another and to said rods in such manner as to transmit at least part of a pressure pulse from one of said rods through successive crystals to the other of said rods, the ones of said crystals adjacent to the respective ones of said rods being poled in the same direction, means including a line balanced with respect to ground and connected to said crystals to pick up any electrical signals developed between the opposing faces of said ones of said crystals, and measuring means connected to said balanced line for measuring a function of the signals thereon as an indication of pressure pulses applied to one of said rods.

6. Apparatus for measuring pressure pulses comprising a pair of axially aligned, longitudinally spaced, electrically grounded pressure rods, a pair of piezoelectric crystals axially disposed between said pressure rods, said crystals being arranged symmetrically about a transverse axis of symmetry and mechanically connected to one another and to said rods in such manner as to transmit at least part of a pressure pulse from one of said rods through successive crystals to the other of said rods, said crystals being poled in the opposite direction with respective opposing faces electrically connected and with respective faces adjacent said rods each electrically connected to a respective rod, pickup means connected to said crystals to pick up any electrical signals developed between the opposing faces of said ones of said crystals, and measuring means connected to said pickup means for measuring the signals thereon as an indication of pressure pulses applied to one of said rods.

7. Apparatus for measuring pressure pulses comprising a pair of longitudinally spaced pressure rods, at least two piezoelectric crystals, a first of said piezoelectric crystals being disposed between said rods and having one face thereof mechanically coupled to one of said rods, a second of said piezoelectric crystals being disposed between said first crystal and the other of said rods and having one face thereof mechanically coupled to the other of said rods, each of said first and second crystals being poled in the same direction so that faces of said first and second crystals facing each other are of opposite polarity, insulating means mechanically coupling together said faces of opposite polarity, and means for measuring a function of the difference in potential between said faces of opposite polarity as an indication of the pressure pulses applied to one of said rods.

8. Apparatus for measuring pressure pulses comprising a pair of longitudinally spaced pressure rods; conductive means electrically connecting said rods so that they are at substantially the same reference potential; at least two piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, said first and second crystals being substantially identical and each of said first and second crystals being poled in the same direction so that faces of said first and second crystals facing each other are of opposite polarity; insulating means mechanically coupling together said faces of opposite polarity; and means for measuring a function of the difference in potential between said faces of opposite polarity as an indication of the pressure pulses applied to one of said rods, said last named means including a pair of electrical conductors forming a transmission line balanced with respect to said reference potential, each of said conductors being connected to a respective one of said faces of opposite polarity.

9. Apparatus for measuring pressure pulses comprising a pair of longitudinally spaced pressure rods; conductive means electrically connecting said rods so that they are at substantially the same reference potential; at least two piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, said first and second crystals being substantially identical and each of said first and second crystals being poled in the same direction so that faces of said first and second crystals facing each other are of opposite polarity; insulating means mechanically coupling together said faces of opposite polarity; and means for measuring a function of the difference in potential between said faces of opposite polarity as an indication of the pressure pulses applied to one of said rods, said last named means including a pair of electrical conductors forming a transmission line balanced with respect to said reference potential and a cathode follower circuit also balanced with respect to said reference potential and connected between said faces of opposite polarity and said transmission line, said cathode follower circuit having its components located adjacent said crystals.

10. Apparatus for measuring pressure pulses comprising a pair of longitudinally spaced grounded pressure rods; a plurality of piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, said first and second crystals being substantially identical and each of said first and second crystals being poled in the same direction so that faces of said first and second crystals facing each other are of opposite polarity, a third of said piezoelectric crystals being disposed between said first and second crystals and mechanically coupling together said faces of opposite polarity, said third crystal being oppositely poled; means electrically connecting adjacent faces of adjacent crystals; and means for measuring a function of the difference in potential between said faces of opposite polarity as an indication of the pressure pulses applied to one of said rods, said last named means including a pair of conductors forming a transmission line balanced with respect to ground, and a difference amplifier having two input terminals, each of said conductors being connected between a respective one of said faces of opposite polarity and a respective input terminal of said amplifier, said amplifier serving to provide an amplified signal systematically related to the difference in potential between said faces of opposite polarity.

11. Apparatus for measuring pressure pulses comprising a pair of longitudinally spaced grounded pressure rods; a plurality of piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, said first and second crystals being substantially identical and each of said first and second crystals being poled in the same direction so that faces of said first and second crystals facing each other are of opposite polarity, a third of said piezoelectric crystals being disposed between said first and second crystals and mechanically coupling together said faces of opposite polarity, said third crystal being oppositely poled; means electrically connecting adjacent faces of adjacent crystals; and means for measuring a function of the difference in potential between said faces of opposite polarity as an indication of the pressure pulses applied to one of said rods, said last named means including an integrating circuit balanced with respect to ground for integrating said difference in potential as a function of time and having a pair of output terminals upon which is developed an integrated output signal balanced with respect to ground, a pair of conductors forming a transmission line balanced with respect to ground, and a difference amplifier having two input terminals, each of said conductors being connected between a respective one of said output terminals of said integrating circuit and a respective input terminal of said amplifier, said amplifier serving to provide an amplified signal systematically related to the integral of the difference in potential between said faces of opposite polarity.

12. Apparatus for measuring pressure pulses comprising a pair of longitudinally spaced grounded pressure rods; at least two piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, each of said first and second crystals being poled in the same direction so that faces of said first and second crystals facing each other are of opposite polarity; insulating means mechanically coupling together said faces of opposite polarity; means for measuring a function of the difference in potential between said faces of opposite polarity as an indication of the pressure pulses applied to one of said rods; and means substantially surrounding said crystals and serving with respect to said crystals as a source and sink of electrons, said last named means comprising material interacting with electrons and gamma rays to substantially the same extent as said crystals, whereby the transfer of charge to and from said crystals by such interaction is substantially balanced out.

13. Apparatus for measuring pressure pulses comprising a pair of longitudinally spaced grounded pressure rods; at least two piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, each of said first and second crystals being poled in the same direction so that faces of said first and second crystals facing each other are of opposite polarity; insulating means mechanically coupling together said faces of opposite polarity; means for measuring a function of the difference in potential between said faces of opposite polarity as an indication of the pressure pulses applied to one of said rods, said last named means including a pair of electrical conductors forming a transmission line balanced with respect to ground and a cathode follower circuit also balanced with respect to ground and connected between said faces of opposite polarity and said transmission line, said cathode follower circuit including a pair of vacuum tubes located adjacent said crystals and each having a plate, a cathode and a control grid, each control grid being connected to a respective one of said faces of opposite polarity by a fine wire covertd with thin insulation and each of said plates being supplied with power over insulated leads; and means substantially surrounding said crystals and serving with respect to said crystals as a source and sink of electrons, said last named means comprising material interacting with electrons and gamma rays to substantially the same extent as said crystals, whereby the transfer of charge to and from said crystals by such interaction is substantially balanced out.

14. Apparatus for measuring pressure pulses comprising a pair of longitudinally spaced grounded pressure rods; at least two piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, each of said first and second crystals being poled in the same direction so that faces of said first and second crystals facing each other are of opposite polarity; insulating means mechanically coupling together said faces of opposite polarity; means for measuring a function of the difference in potential between said faces of opposite polarity as an indication of the pressure pulses applied to one of said rods; and means substantially surrounding said crystals and serving with respect to said crystals as a source and sink of electrons, said last named means comprising material of atomic number substantially the same as that of said crystals, whereby the transfer of charge to and from said crystals by interaction with electrons and gamma rays is substantially balanced out, a thin conductive member disposed between said material and said crystals and serving as an electrostatic shield, and a relatively thin layer of insulating material disposed between said conducting member and said crystals and serving to exclude ionizable gas from the vicinity of said crystals.

15. Apparatus for measuring pressure pulses associated with preceding radiation pulses comprising a pair of longitudinally spaced grounded pressure rods; a plurality of piezoelectric crystals, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, said first and second crystals being substntially identical and each of said first and second crystals being poled in the same direction so that faces of said first and second crystals facing each other are of opposite polarity, a third of said piezoelectric crystals being disposed between said first and second crystals and mechanically coupling together said faces of opposite polarity, said third crystal being oppositely poled; means electrically connecting adjacent faces of adjacent crystals; means for measuring a function of the difference in potential between said faces of opposite polarity as an indication of the pressure pulses applied to one of said rods, said last named means including an integrating circuit balanced with respect to ground for integrating said difference in potential as a function of time and having a pair of output terminals upon which is developed an integrated output signal balanced with respect to ground, the time constant of said integrating means being long relative to the duration of said pressure pulses and short relative to the time between one of said radiation pulses and a corresponding one of said pressure pulses; a pair of conductors forming a transmisison line balanced with respect to ground, a cathode follower circuit also balanced with respect to ground and connected between said integrating circuit and said transmission line, and a difference amplifier having two input terminals, each connected to a respective one of said conductors, and amplifier serving to provide an amplified signal systematically related to the charge transferred between said faces of opposite polarity; a member substantially surrounding said crystals and formed of substance having substantially the same atomic number as that of the crystals, whereby the transfer of charge to and from the crystals by interaction with electrons and gamma rays is substantially balanced out, a thin conductive layer disposed between said member and said crystals and serving as an electrostatic shield, and a thin insulating layer disposed between said conductive layer and said crystals and serving to exclude ionizable gas from the vicinity of said crystal.

16. Apparatus for measuring pressure pulses comprising a pair of longitudinally spaced grounded pressure rods; at least two piezoelectric crystals, said crystals being formed of X-cut quartz, a first of said piezoelectric crystals being disposed between said rods and having one face thereof mechanically and electrically coupled to one of said rods, a second of said piezoelectric crystals being disposed between said first crystal and the other of said rods and having one face thereof mechanically and electrically coupled to the other of said rods, each of said first and second crystals being poled in the same direction so that faces of said first and second crystals facing each other are of opposite polarity; insulating means mechanically coupling together said faces of opposite polarity; means for measuring a function of the difference in potential between said faces of opposite polarity as an indication of the pressure pulses applied to one of said rods; and means substantially surrounding said crystals and serving with respect to said crystals as a source and sink of electrons, said last named means comprising a member formed of silicone rubber loaded with silica to give it an atomic number substantially the same as that of quartz, whereby the transfer of charge to and from said crystals by interaction with electrons and gamma rays is substantially balanced out, a conductive coating of silver paint disposed between said member and said crystals and serving as an electrostatic shield, and a relatively thin layer of insulating material disposed between said conductive coating and said crystals and serving to exclude ionizable gas from the vicinity of said crystals.

17. A piezoelectric pressure transducer for use in radiation fields of high intensity which comprises a piezoelectric crystal, a member substantially surrounding said crystal and formed of substance having substantially the same atomic number as that of the crystal, whereby the transfer of charge to and from the crystal by interaction with electrons and gamma rays is substantially balanced out, a thin conductive layer disposed between said member and said crystal and serving as an electrostatic shield, and a thin insulating layer disposed between said conductive layer and said crystal and serving to exclude ionizable gas from the vicinity of said crystal.

18. Apparatus for measuring pressure pulses in the presence of radiation pulses of longer duration comprising a pair of longitudinally spaced pressure rods, piezoelectric crystal means disposed between said pressure rods, said crystal means being mechanically connected to said rods in such manner as to transmit at least part of a pressure pulse from one of said rods through said crystal means to the other of said rods, pickup means connected to said crystals to pick up any electrical signals developed by said crystal means, integrating means connected to said pickup means for integrating said signals with respect to time to develop integrated output signals, the time constant of said integrating means being short relative to the time between one of said radiation pulses and a corresponding one of said pressure pulses, and measuring means connected to said integrating means for measuring said integrated output signals as an indication of pressure pulses applied to one of said rods.

References Cited

UNITED STATES PATENTS 3,137,171   6/1964   Kratz et al. _____ 73—398

LOUIS R. PRINCE, *Primary Examiner.*

D. O. WOODIEL, *Assistant Examiner.*

UNITED STATES PATENT OFFICE
CERTIFICATE OF CORRECTION

Patent No. 3,336,807 August 22, 1967

Victor A. J. van Lint et al.

It is hereby certified that error appears in the above numbered patent requiring correction and that the said Letters Patent should read as corrected below.

Column 3, line 8, for "sandwith" read -- sandwich --; column 4, line 5, for "conductor" read -- condenser --; line 42, for "The" read -- the --; column 5, line 37, before "local" insert -- to --; column 10, line 37, for "and" read -- said --.

Signed and sealed this 3rd day of September 1968.

(SEAL)
Attest:

Edward M. Fletcher, Jr.

Attesting Officer

EDWARD J. BRENNER

Commissioner of Patents